United States Patent [19]

Arnold et al.

[11] 4,263,590

[45] Apr. 21, 1981

[54] METHOD AND ARRANGEMENT FOR THE GENERATING AND PROCESSING OF ELECTRICAL IMPULSES

[75] Inventors: Werner Arnold, Nuremberg; Josef Neubauer, Grossschwarzenlohe, both of Fed. Rep. of Germany

[73] Assignee: Diehl GmbH & Co., Nuremberg, Fed. Rep. of Germany

[21] Appl. No.: 50,540

[22] Filed: Jun. 21, 1979

[30] Foreign Application Priority Data

Jun. 28, 1978 [DE] Fed. Rep. of Germany ....... 2828285

[51] Int. Cl.$^3$ .............................................. G01D 5/34

[52] U.S. Cl. ......................................... 340/672; 328/1

[58] Field of Search ..................... 340/671, 672, 309.5; 328/1

[56] References Cited

U.S. PATENT DOCUMENTS

| | | | |
|---|---|---|---|
| 3,282,099 | 11/1966 | Kingman | 340/672 X |
| 3,304,434 | 2/1967 | Koster | 340/672 X |
| 3,710,265 | 1/1973 | Gray | 340/672 |
| 3,728,565 | 4/1973 | O'Callaghan | 340/672 |
| 3,848,157 | 1/1974 | Kripl | 340/672 X |
| 3,930,201 | 12/1975 | Ackermann | 340/672 X |

*Primary Examiner*—Harold I. Pitts

*Attorney, Agent, or Firm*—Scully, Scott, Murphy & Presser

[57] ABSTRACT

A method and an electro-mechanical arrangement for the generating and processing of electrical impulses for the setting or correction of an electronic digital display through the intermediary of an impulse generator. The impulse generator consists of an impulse transmitter and an impulse collector whereby, by means of the impulse emitter which evidences a plurality of impulse-generating elements, preferably arranged at uniform spacings in a circular path relative to a rotational axis, a plurality of electrical contacts are adapted to be closed in cooperation with the impulse-generating elements. The contacts of the impulse collector, generating mutually timewise displaced but still overlapping impulses whose frequency is proportional to the relative speed between the impulse transmitter and the impulse collector and whose phase position, in essence the phase lead and phase lag, is dependent upon the relative direction of rotation between the impulse transmitter and the impulse collector.

7 Claims, 3 Drawing Figures

METHOD AND ARRANGEMENT FOR THE GENERATING AND PROCESSING OF ELECTRICAL IMPULSES

BACKGROUND OF THE INVENTION

1. Field of the Invention

The present invention relates to a method and an electro-mechanical arrangement for the generating and processing of electrical impulses for the setting or correction of an electronic digital display through the intermediary of an impulse generator. The impulse generator consists of an impulse transmitter and an impulse collector whereby, by means of the impulse transmitter which comprises a plurality of impulse-generating elements preferably arranged at uniform spacings in a circular path relative to a rotational axis, a plurality of electrical contacts are adapted to be closed in cooperation with the impulse-generating elements. The contacts form the impulse collector, generating mutally timewise displaced out still overlapping impulses whose frequency is proportional to the relative speed between the impulse transmitter and the impulse collector and whose phase position, in essence the phase lead and phase lag, is dependent upon the relative direction of rotation between the impulse transmitter and the impulse collector.

2. Discussion of the Prior Art

An earlier proposal, as disclosed in German Patent Application P No. 26 58 105, encompasses an arrangement of the above-mentioned type which has an electronic module connected between the outlets of an impulse generator and an electrical counter for the identification of the direction of rotation of the impulse generator axis, and with the electronic module consisting of two flip-flops.

Through the two contacts, respectively contact rows, of the impulse collector which are acted upon by the impulse-transmitting elements, there are generated timewise displaced but still overlapping impulses. The identification of the rotational axis is carried out by means of two flip-flops which are actuated in accordance with the phase lead or phase lag of the current impulse rate of increase or slope and whose counting impulse is supplied to a counter conforming to the direction of rotation. The two rates of increase of each one of an impulse pair appearing at the output of the impulse generator are thus analyzed in accordance with their phase position, then by means of the subsequently actuated flip-flop there is activated the corresponding counter input and a counting impulse introduced into the counter for this impulse pair.

SUMMARY OF THE INVENTION

Accordingly, it is an object of the present invention to provide a method, as well as an arrangement for the actuation thereof, which improves upon the prior art arrangement to the extent in that the electronic assembly which is connected between the impulse generator and the display can in its entirety be replaced by a microprocessor module. This modular component is offered for sale in the marketplace in the widest possible construction as a mass-produced item and can fulfull all of the necessary functions for the above arrangement, in essence, the count direction identification, the counting of the impulses, the pulsing of the counter, the decoding of the output signals of the counter, as well as the storage of further informations, for example, waking and alarm functions, in a highly integrated constructional manner.

The utilization of the functional sequence as described in the state of the art discrete components pertaining to the data input for the setting of an electronic digital display with the aid of a microprocessor would not appear to be practical since, this functional sequence with respect to only one counting impulse for each impulse pair and the identification of the direction of rotation through the phase position of the increase curve of the two impulses by the means of two "flip flops" would require too many synchronizing steps in a microprocessor, meaning that the counting in speed of the impulses into the counter would be reduced.

Through the utilization of the invention there is either increasesd input speed at a constant-remaining number of the impulse-generating elements or, alternatively, the number of the impulse-generating elements of the impulse transmitter for the purpose of the miniaturization of this component at its use, for example, in a wrist watch, can be reduced while maintaining the input speed.

BRIEF DESCRIPTION OF THE DRAWINGS

Reference may now be had to a preferred embodiment of an arrangement pursuant to the invention, taken in conjunction with accompanying drawings; in which.

DETAILED DESCRIPTION OF THE PREFERRED EMBODIMENTS

Figure 1:
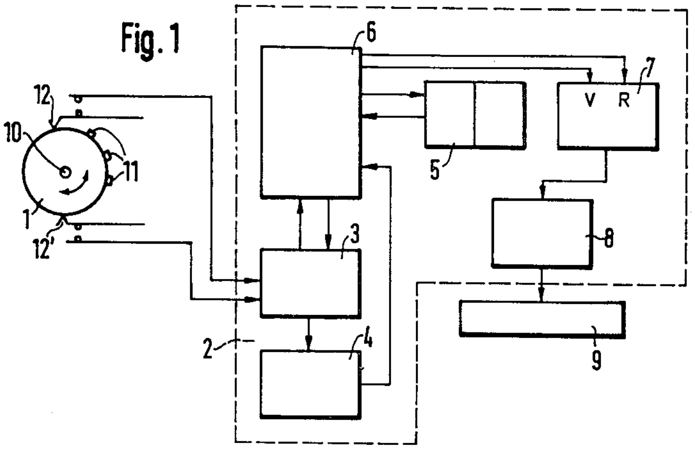
FIG. 1 illustrates the inventive impulse generator with a digital display arrangement and the interposed microprocessor.

Initially, having regard to FIG. 1, there is elucidated the arrangement for the realization of a method for the generating and processing of electronic impulses for the setting or correcting of an electronic digital display through the intermediary of an impulse generator.

According to FIG. 1, the inventive arrangement includes an impulse generator 1 and an electronic component, namely, a microcomputer which is connected between the outputs of the impulse generator 1 and an electronic digital display 9.

This component or module contains a first and a second programmable storage or memory 3 and 4 (record-read-store), a reference memory 5 (for example ROM), a coincidence element 6 for the comparison of the memory storage contents 3, 4 with the content of the memory 5, a counter 7, as well as a decoder 8 for the conversion of the output signals of the counter 7 into signals which are usable for a multi-location seven segment display.

The operating sequence at the actuation of the impulse transmitter can be described as follows:

At the rotation of the impulse generator axis 10, an impulse collector with contacts 12, 12' is actuated from the impulse-generating elements 11 in such a manner that at each impulse change there are present two voltage values at the output of the impulse generator 1. The binary information for each impulse change in the form of an impulse pair obtained therefrom, in accordance with the proposed method, is recorded in the programmable storage or memory 3. In the memory storage 4 the binary information is deposited in the form of an impulse pair which corresponds to the voltage values which were present at the output of the impulse generator precedent to the last impulse change.

Figure 2:
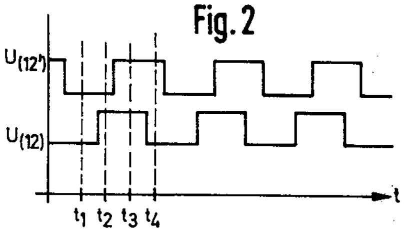
FIG. 2 illustrates in a superimposed relationship the time sequence of two impulse trains at the output of the impulse generator.

For an explanation of this method, reference is made to FIG. 2 of the drawings.

In the drawing there is illustrated the timewise impulse cycle at the outputs of the impulse generator 1. Characterized by $t_1$-$t_4$ are four segments along the time axis.

In the illustrated example, at the time point $t_1$ there is present at the output of the generator the binary informations as an impulse pair 00, at the time point $t_2$ 10, at the time point $t_3$ 11, and at the time point $t_4$ 01. These four impulse pair values again reverse cyclically at the rotation of the impulse generator axis in one direction. Present at the output of the impulse generator, located, for example, preceding an impulse change, is the information 0.1, corresponding to time point $t_4$. At the rotation of the generator axis in one direction there appears at the output as the next information the combination 00, in the other direction the combination 11.

In that manner there can be determined numerical groups which are clearly associated with a predetermined direction of rotation of the impulse generator axis.

The numerical groups 0010, 1011, 1101, 0100 thus correspond to one direction of rotation (for example the direction "forward"), the groups 1000, 0111, 0001 correspond to the other direction of rotation ("rearward").

The impulse informations which are deposited in the memory storage 4 preceding the impulse change and in the memory storage 3 after the impulse change are collected, pursuant to the inventive method, into a 4-number combination. In the reference memory storage 5 there are found all possible numerical combinations which can appear at the output of the impulse generator, four correspond in accordance with the above definition to the forward direction of rotation, a further four to the rearward direction of rotation; these numerical combinations are compared with the informations which are present at the output of the generator.

At the coincidence of one of these numerical combinations with the informations appearing at the output of the generator and which are stored in the memory storages 3 and 4, a counting impulse is introduced into the counter whereby there is activated the forward or rearward count input which corresponds to the numerical combination.

Thereafter the resulting count condition is decoded for an electronic digital display.

The content of the memory storage 3 is then rewritten in the memory storage 4. This memory storage thus again contains a digital pair value which can then be combined with a new pair value appearing after the next impulse change at the generator outputs, which is inscribed in the memory storage 3. The sequence of the series is interchangeable.

Through the described sequence-storage of the new-old numerical conditions, interrogating the memory storage contents and comparing with the fixed deposited forward-rearward count informations, there becomes possible the utilization of a microprocessor for the count direction identification. Through the fact that this identification takes place at each impulse change, in essence at each new condition appearing at the outputs of the input generator, the input speed is increased by a factor of 4 at a constant-remaining number of the impulse-generating elements of the impulse generator; that of the arrangement and the method which are described in German Patent Application No. P 26 58 105 merely affords a counting in impulse sequence for each impulse pair in comparison with now one count sequence at each impulse rise, in effect four counting sequences at each pair at the timewise displaced but still overlapping impulses.

Due to this advantageous breakdown of the available impulse information there is facilitated the reduction in the number of the impulse-transmitting elements on the generator, in effect, the reduction of the constructional size of the generator itself, which is necessary in the utilization of this arrangement in a extremely small apparatus, for example, a wrist watch.

Figure 3:
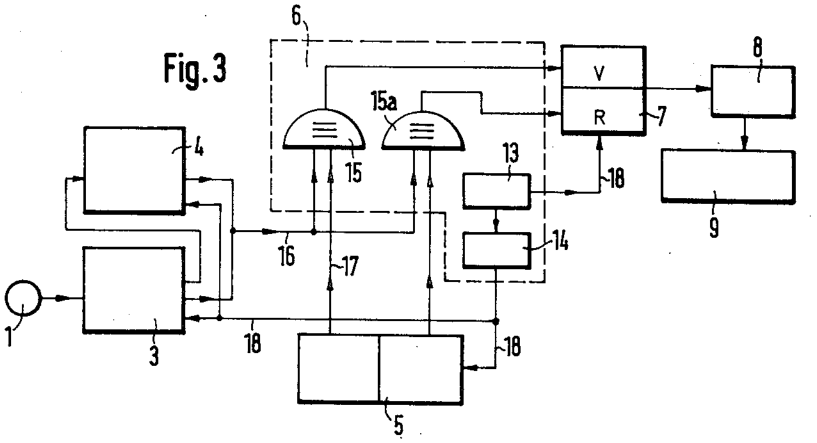
FIG. 3 shows a circuit block diagram with the synchronizing and comparator arrangement contained in the central control unit.

In FIG. 3 there is again illustrated the inventive construction of the arrangement for the direct input of impulse generator signals for the setting, and the respective correction, of an electric digital display.

The two memory storages 3 and 4 (RAM) are connected through a 4-bit conductor 16 with two comparator units, equivalent elements 15, 15*a* which, together with the arrangements 13 (pulse sender) and 14 (module-4-counter) which control the program sequence, form the central control unit 6 of the microprocessor 2. The 4×4 bit forward informations and the 4×4 bit rearward informations, as well as the 8×4 bit "not counting" informations are similarly introduced through two 4-bit conductors 17 into the 4-bit comparator units 15 and 15*a*.

At a coincidence of all four positions of one of the 4-bit words with the four positions of the 4-bit informations combined the contents of the memory storages 3 and 4, one of the two comparator units 15, 15*a* activates the input of the counter 7 for the informations "forwards" or "rearwards" associated with its output.

By means of a pulse generator 13 and a module 4-counter 14, through control conductors 18 there are interrogated the addresses from the memory storages 3, 4 and 5, storage and transfer sequences initiated the forward-rearward counters are synchronized.

What is claimed is:

1. In a method for the generating and processing of electrical impulses for the setting and correcting of an electronic digital display through a pulse generator generating at least two timewise displaced but still overlapping impulse trains by the rotation of an impulse transmitter against an impulse collector, the frequency of the impulses being dependent upon the rotational speed of the impulse transmitter relative to the impulse collector and the opposite phase from the direction of rotation of the impulse transmitter relative to the impulse collector, the improvement comprising of the following sequentially timed steps:

(a) introducing said impulse trains into a microprocessor;

(b) storing digital impulse informations contained in said microprocessor which newly appears at the generator output at each impulse change in a first memory storage.

(c) introducing a further digital impulse information present at the generator output preceding the impulse change into a second memory storage;

(d) combining said two impulse informations into a bit word having at least 4-bits;

(e) comparing said bit word with fixed stored bit words which are associated with a predetermined direction of rotation of the impulse generator axis to obtain forward-rearward count information;

(f) introducing the forward-rearward count information obtained through the comparison into a counter;

(g) decoding the count condition for an electronic digital display, (h) and transferring the last impulse information present at the generator output so as to be combinable with newly storaged information into a bit word with at least 4-bits.

2. In an electromechanical arrangement for effectuating a method of generating and processing of electrical impulses for the setting or correcting of an electronic digital display, including an impulse generator having an impulse transmitter and an impulse collector, said impulse transmitter being a plurality of impulse-generating elements arranged in uniform spacing along a circular path concentrically relative to an axis of rotation, said impulse collector having a plurality of electrical contacts closable in cooperation with said impulse-generating elements and which generate timewise displaced but overlapping impulse trains where frequency is proportional to the relative speed between the impulse transmitter and the impulse collector and their phase position, phase lead and phase lag, dependent upon the relative direction of rotation between the impulse transmitter and the impulse collector, the improvement comprising:

An electronic component being connected to the output of said impulse generator, said component comprising a first storage and a second storage for the impulses generated by said impulse generator, a program reference value memory storage, control means for controlling said storages and comparing the informations contained in said storages, a forwards-rearwards counter and a decoder for an electronic digital display, the impulse information newly formed at the actuation of the impulse generator at each impulse change being storable in said first storage, at this time point the impulse information preceding the last impulse change being storable in said second storage, wherein through comparison of the stored contents of said first and second storages with the fixed information in the memory storage identifying the phase position of the impulses there is identified the direction of rotation of the impulse generator axis and the count input of the forwards-rearwards counter responsive to the sense of rotation is controllable, and the count content for the digital display is adapted to be decoded and the information stored in said first storage is transferable into said second storage.

3. Arrangement as claimed in claim 2, said first and second storages comprising addressable storages (RAM) and memory storage comprising a reference programmed value storage (ROM).

4. Arrangement as claimed in claim 2 or 3, wherein the old-new informations present at the impulse generator outputs are stored as 4-bit words in said memory storage and are singularly associated with a predetermined direction of rotation of said inpulse generator axis.

5. Arrangement as claimed in claim 4, wherein the comparison of the bit combinations stored in said first and second storages with the 4-bit words in said memory storage provides for identification of the informations forwards counting and rearwards counting.

6. Arrangement as claimed in claim 2, said electronic component comprising a microprocessor containing all control functions required for the supplying of an electronic digital display.

7. Arrangement as claimed in claim 3, wherein the capacity of said addressable first and second storages is adapted for the storage of additional informations.

* * * * *